(12) United States Patent
Nguyen

(10) Patent No.: US 8,237,875 B2
(45) Date of Patent: Aug. 7, 2012

(54) TELEVISION FRAME AND MOUNTING SYSTEM

(76) Inventor: Dai Bao Ngoc Nguyen, Santa Ana, CA (US)

( * ) Notice: Subject to any disclaimer, the term of this patent is extended or adjusted under 35 U.S.C. 154(b) by 433 days.

(21) Appl. No.: 12/431,938

(22) Filed: Apr. 29, 2009

(65) Prior Publication Data

US 2010/0276562 A1 Nov. 4, 2010

(51) Int. Cl.
*H04N 5/64* (2006.01)
(52) U.S. Cl. .................... 348/841; 348/825; 348/836
(58) Field of Classification Search ............... 348/836, 348/837, 839, 825, 739, 794, 841; 248/27.1, 248/494, 498; 52/36.4, 173.1
See application file for complete search history.

(56) References Cited

U.S. PATENT DOCUMENTS

| | | | | |
|---|---|---|---|---|
| 2,549,710 | A * | 4/1951 | Pritchard | 556/119 |
| 5,175,627 | A * | 12/1992 | Josephs | 348/841 |
| 5,549,267 | A * | 8/1996 | Armbruster et al. | 248/442.2 |
| 5,638,096 | A * | 6/1997 | Schwartz | 248/442.2 |
| 7,287,737 | B2 * | 10/2007 | Rossi | 248/475.1 |
| 7,808,563 | B2 * | 10/2010 | Sanchez | 348/818 |
| 7,854,415 | B2 * | 12/2010 | Holbrook et al. | 248/125.2 |
| 2006/0231711 | A1 * | 10/2006 | Shin | 248/291.1 |
| 2007/0103605 | A1 * | 5/2007 | Maruta | 348/797 |
| 2008/0308697 | A1 * | 12/2008 | Woods et al. | 248/231.91 |

* cited by examiner

*Primary Examiner* — Brian Glessner
*Assistant Examiner* — Adam Barlow

(57) ABSTRACT

A flat panel television mounting device includes a picture-type frame having a notch back surrounding an open central area along with a glass pane sized for reception by the notch back and supported by the frame. A linen is provided and adhered to one side of the glass pane with a central portion of the linen removable from the glass pane leaving a border around the removed central portion for exposing a television screen when the glass pane is disposed thereagainst.

2 Claims, 3 Drawing Sheets

TELEVISION FRAME AND MOUNTING SYSTEM

The present invention generally relates to cover frame assemblies for mounting onto a flat panel display such as a high-definition television set. More particularly, the present invention provides for a frame suitable for use with various size flat panel televisions.

Flat panel displays such as plasma and LCD panels have become increasingly common and will gradually replace virtually all cathode ray tube televisions and displays.

Flat panel televisions and displays are frequently hung on a wall in a manner resembling paintings and various mounting frames have been devised for attaching such flat panel displays to a wall.

Despite the relatively small thickness of these panels, compared to cathode ray tubes, they often distract from the décor of a room in which they are hung.

Heretofore, frames have been designed for a specific flat panel display size and as such are quite expensive.

There is a needed a flat panel television frame or mounting device that can be used with any number of different sized flat panel television sets.

The present invention fills that need by providing a universal frame that gives a TV, and the TV screen itself the appearance that the TV is larger than what it really is while reducing the visual distance between the TV and a wall, making the TV look closer and more picture frame like. In addition, a universal frame in accordance with the present invention provides an appearance of a built in wall TV without the cost thereof, however, it also enables mobility of the TV and enables air circulation around the TV which is advantageous for TVs that are operating for long periods of time, for example, 12 hours a day.

SUMMARY OF THE INVENTION

A flat panel television-mounting device in accordance with the present invention generally includes a picture-type frame having a notched back surrounding open central area along with a glass pane, which is sized for reception by the notched back and supported, by the frame.

A linen or matt, is adhered to one side of the glass pane and includes a central portion thereof which is removable from the glass pane leaving a border around the removed central portion for exposure to a television screen when the glass pane is disposed thereagainst.

This configuration enables a television screen of any size smaller than the frame to be viewed with the glass pane disposed thereagainst. As noted, the linen is cuttable to a size equal to the size of the television screen and removable from the glass to enable the television screen viewing.

More particularly, the invention further comprises indicia disposed on the linen for outlining various television screen sizes which facilitates cutting of the liner.

In addition, the present invention may include an attachment for securing the picture-type frame to a flat pane television and this attachment may include a cord attached to the picture-type frame and passable around the back of the flat panel television.

A scaffold may be provided for supporting the flat panel television to a wall with the scaffold including a pair of vertically orientable uprights fixable to a wall with a pair of brackets fixed to the uprights for preventing outward movement of the flat panel television from the wall.

A method in accordance with the present invention for mounting a flat panel television generally includes providing a glass pane with a linen attached thereto and cutting a central portion of the linen. Thereafter, the central portion of the linen is removed from the glass pane and the glass pane with the central linen removed therefrom is disposed in a frame. The frame is then attached to a flat panel television with the glass pane against the television screen and an outer portion with the linen surrounding the television screen. In this manner the television appears as a painting or a work of art.

BRIEF DESCRIPTION OF THE DRAWINGS

The advantages and features of the present invention will be better understood by the following description when considered in conjunction with the accompanying drawings in which.

DETAILED DESCRIPTION

Figure 1:
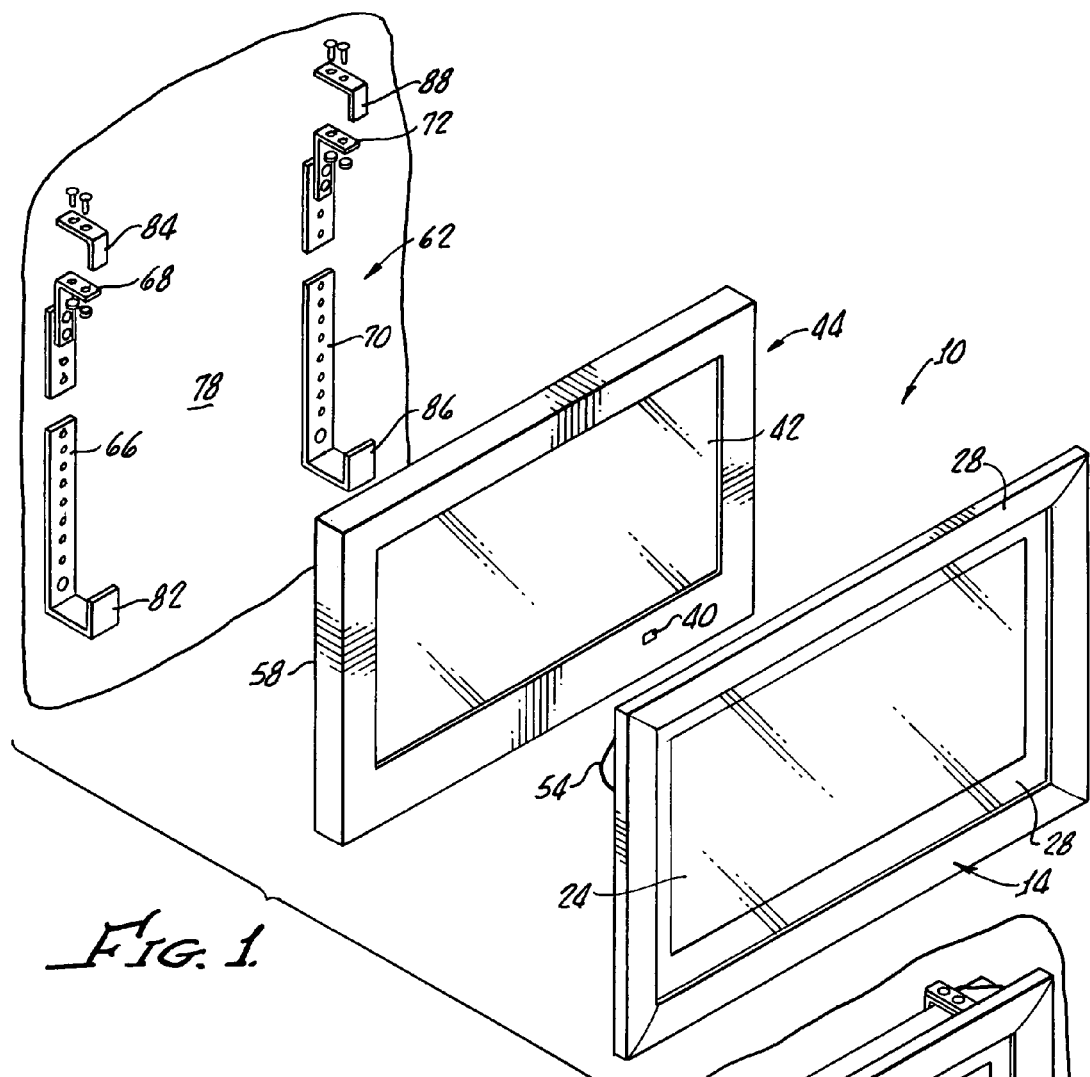
FIG. 1 is a exploded view of the present invention in combination with a flat panel TV and generally showing a picture-type frame, a glass pane and a linen adhered to the glass pane having a central portion thereof removed along with a scaffold for supporting the TV on a wall.
Figure 2:
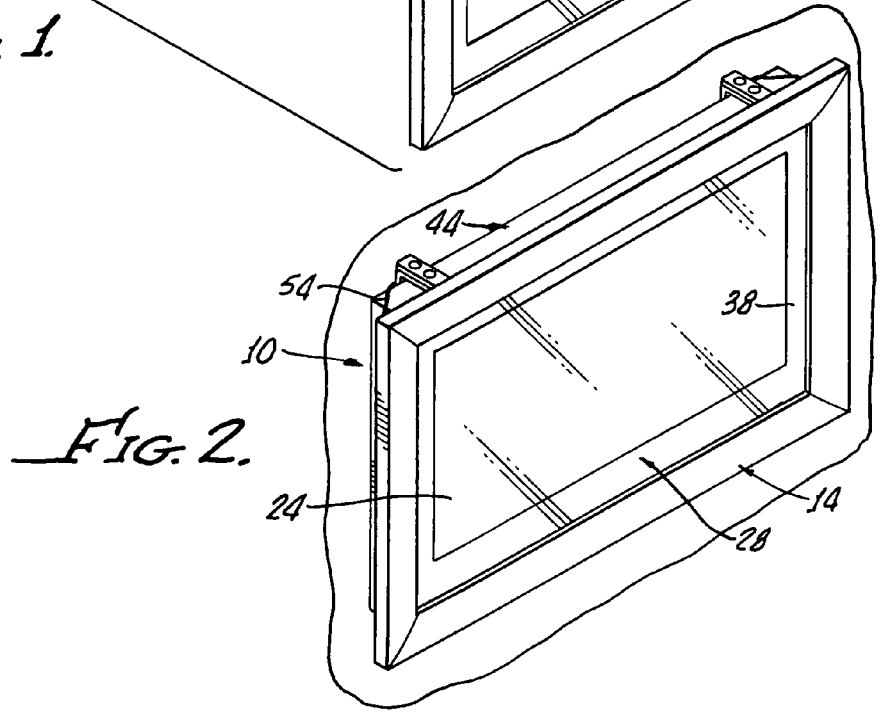
FIG. 2 is an assembled view of the TV on the scaffold without the frame.
Figure 3:
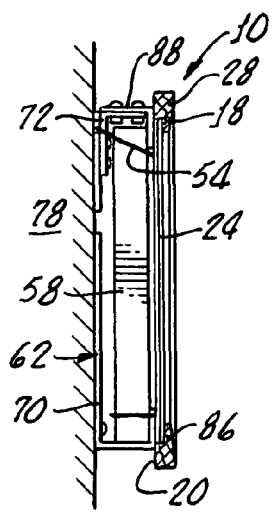
FIG. 3 is a side view of the assembled frame, TV, and scaffold.

With reference to FIGS. 1-3, there is shown a flat panel, television mounting device 10, which generally includes a picture-type frame 14 having a notch 18 (FIG. 3) in a back 20 of the frame 14 for receiving a glass pane 24.

Figure 4:
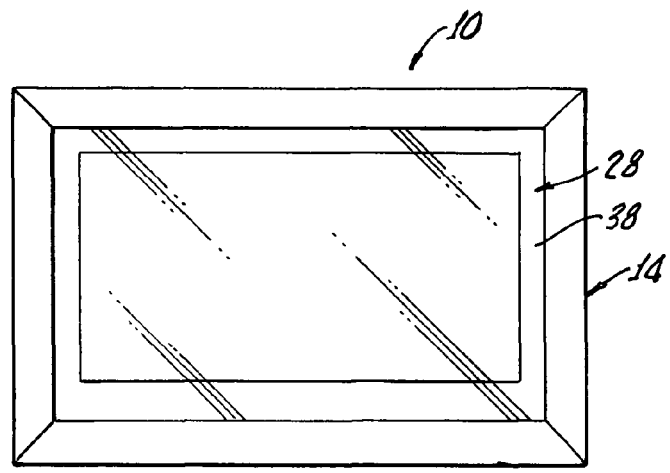
FIG. 4 is a front plan view of the glass pane with the linen having a cutaway central portion.
Figure 5:
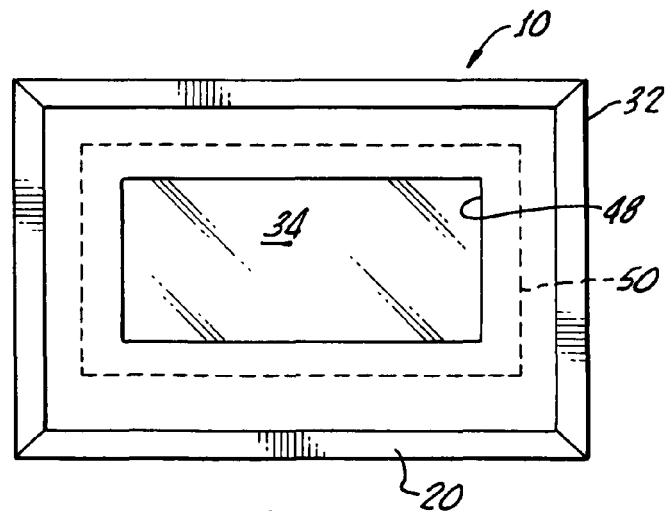
FIG. 5 is a back plan view of the glass pane and linen with indicia (broken lines) indicating where the linen may be cut in order to accommodate for various TV screen sizes.

As best shown in FIGS. 4 and 5, a linen 28 is adhered to one side 32 of the glass pane 24 with a central portion 34 of the linen 28 removable from the glass pane 24 leaving a matte-like border 38 for exposing a screen 42 of a flat screen TV 44.

The linen 28 is removably adhered to the one side 32 of the glass pane 24 and indicia, such as broken lines 48, 50 provide cutting guides 48, 50 for various television screen sizes, the linen being shown cut along the line 48 to expose the central portion 34.

The linen, being transparent to infrared eliminates the need and expensive costs of remote relay systems necessary with conventional television frames. Thus, the linen 28 by way of the remaining border 38 enables passage of an infrared signal to a TV receiver 40 while at the same time providing the appearance of a solid border.

Thus, the present invention reduces the cost of custom framing thereby enabling a framed TV affordable to everyone. As much as eighty percent of the cost associated with framing a TV will be eliminated. This is due to the fact that the present invention can be mass manufactured instead of being custom made to a specific size.

In addition, the glass pane 24 protects the television screen 42 against scratches associated with cleaning or other accidents.

In addition, the glass pane 24, which is preferably shatter resistant, protects the television 44 during a major accident such earthquakes, the frame 14 protects the TV 44 inasmuch as the linen 28 and glass pane 24 may shatter but protects the television with the glass pane 24 shattering and the linen 28 preventing any shards from causing collateral damage during a natural disaster.

With reference again to FIGS. 1 and 3, a cord 54 attached to the frame 14 in a conventional manner and passable around a back 58 of the television 44 provides a means for attaching the frame 14 to the television 44 while any other suitable attachment device or mechanism (not shown) may be utilized.

With reference again to FIGS. 1, 2, and 3, a flat panel television mounting device 10 in accordance with the present invention further may include a scaffold 62 including vertical members 66, 68, 70, 72 attachable to a wall 78 and brackets 82, 84, and 86, 88 for supporting the television 44 against the wall 78 as illustrated in FIGS. 2 and 3. The brackets 82, 84, 86, 88 being adjustable in both vertical and horizontal directions against the member 66, 68, 70, 72 in order to accommodate for various size TVs.

Figure 6:
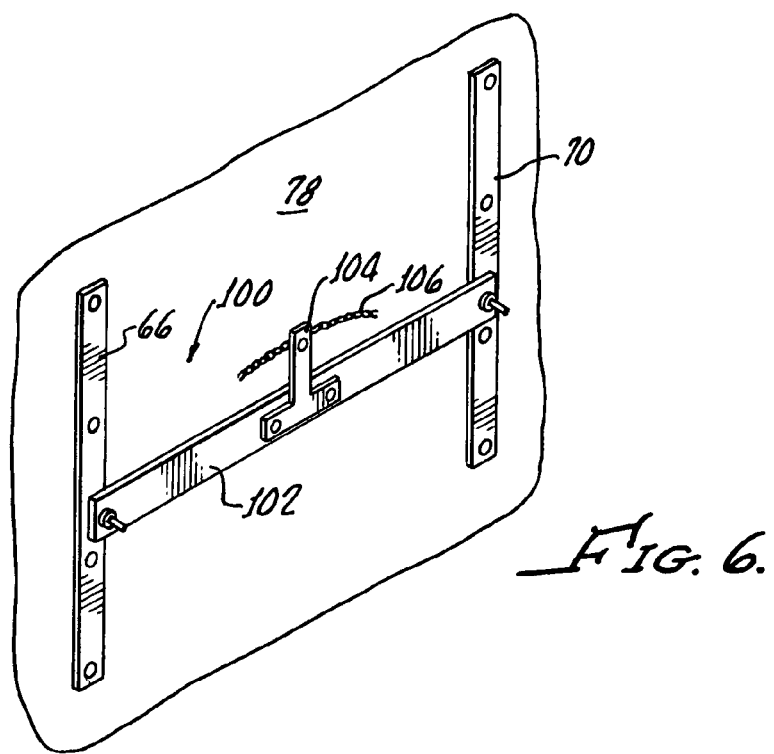
FIGS. 6 and 7 show an alternative scaffold with a crow bar and back.

An alternative scaffold 100 includes a cross bar 102 with a hook 104 upstanding therefrom. Common reference number in FIG. 6 represents identical or substantial equivalent element shown in FIG. 1.

Figure 7:
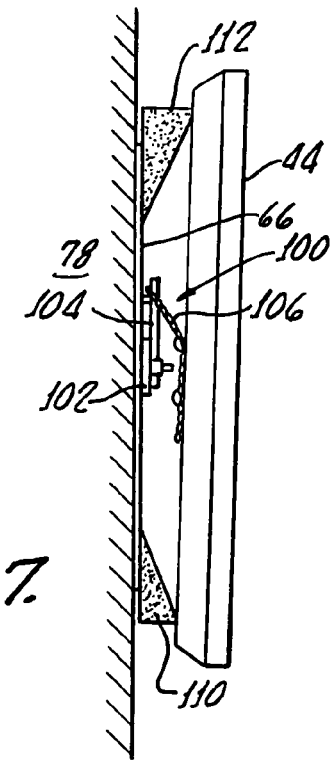

A chain 106 attached to the television 44 enables the television 44 to be hung from the hook 104 as shown in FIG. 7 and wedges 110, 112 enable tilting or positioning the television 44 against the wall 78 to enhance a viewer's perspective of the television from a sitting or reclining position. This is important in particular for handicapped or infirmed viewers.

A method in accordance with the present invention for mounting a flat panel television includes providing a glass pane with the linen adhered thereto and cutting a central portion of the linen along with removing the central portion of the linen from the glass pane, disposing the glass pane with the central linen removed in a frame and thereafter attaching the frame to the flat panel television with the glass pane against a television screen with an outer portion of the linen surrounding the television screen 42.

Although there has been hereinabove described a specific television frame and mounting system in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A flat panel television mounting device comprising:
   a picture-type frame having a notched back surrounding an open central area;
   a matt pane sized for reception by said notched back and supported by the frame, said matt pane having a removable and disposable central portion and a border portion, around the removable and disposable central portion, for exposing a television screen when a glass pane is disposed thereagainst; and
   a scaffold for supporting said flat panel television on a wall, said scaffold including a hook and the device further includes a chain for hanging the television from the hook and at least one wedge for enabling angulation of the television with respect to the wall.

2. A flat panel television device comprising:
   a picture-type frame having a notched back surrounding an open central area;
   a glass pane sized for reception by said notched back and supported by the frame;
   a linen/matt, adhered to one side of said glass pane, for enabling a television screen of any size smaller than said frame to be viewed with said glass pane being disposed against said television screen, said linen/matt being cuttable to a size equal to a size of said television screen and removable from said glass pane to enable the television screen viewing; and
   a scaffold for supporting said flat panel television on a wall, said scaffold including a hook and the device further includes a chain for hanging the television from the hook and at least one wedge for enabling angulation of the television with respect to the wall.

* * * * *